US007946554B2

(12) United States Patent
Sassatelli et al.

(10) Patent No.: US 7,946,554 B2
(45) Date of Patent: May 24, 2011

(54) SELF-ALIGNING SUPPORT ASSEMBLY AND METHOD FOR ROTATABLE CYLINDRICAL COMPONENTS

(75) Inventors: John Matthew Sassatelli, Valley Falls, NY (US); Gary Charles Popham, Gardner, MA (US); Virgil Vaillancourt, Fitchburg, MA (US); Michael Raymond Kolk, Ashburnham, MA (US)

(73) Assignee: General Electric Company, Schenectady, NY (US)

( * ) Notice: Subject to any disclaimer, the term of this patent is extended or adjusted under 35 U.S.C. 154(b) by 88 days.

(21) Appl. No.: 12/345,797

(22) Filed: Dec. 30, 2008

(65) Prior Publication Data

US 2010/0163705 A1 Jul. 1, 2010

(51) Int. Cl.
*F16M 13/00* (2006.01)

(52) U.S. Cl. .............. 248/580; 248/671; 248/346.2; 414/433

(58) Field of Classification Search .......... 248/580, 248/637, 667, 671, 676, 678, 522, 188.3, 248/346.2; 184/6.11; 414/433
See application file for complete search history.

(56) References Cited

U.S. PATENT DOCUMENTS

| | | | | |
|---|---|---|---|---|
| 1,061,672 A * | 5/1913 | Hodgkinson | ............... | 384/313 |
| 1,491,423 A * | 4/1924 | Rice | ............... | 60/687 |
| 2,385,321 A * | 9/1945 | Miller | ............... | 414/433 |
| 3,221,400 A * | 12/1965 | Halsey | ............... | 29/760 |
| 4,062,456 A * | 12/1977 | Birdwell | ............... | 414/680 |
| 4,191,356 A * | 3/1980 | Ashmun et al. | ............... | 248/678 |
| 4,452,558 A * | 6/1984 | Muraguchi | ............... | 414/433 |
| 4,519,279 A * | 5/1985 | Ruggeri | ............... | 82/162 |
| 4,526,503 A * | 7/1985 | Muraguchi | ............... | 414/433 |
| 5,024,002 A * | 6/1991 | Possati | ............... | 33/549 |
| 5,331,243 A * | 7/1994 | Halbohm | ............... | 310/91 |
| 6,085,417 A | 7/2000 | Anderson, III et al. | | |
| 6,115,917 A | 9/2000 | Nolan et al. | | |
| 6,364,277 B1 * | 4/2002 | Miller | ............... | 248/676 |
| 2004/0003968 A1 * | 1/2004 | Rakhmailov | ............... | 184/6.11 |
| 2006/0124824 A1 * | 6/2006 | Taylor | ............... | 248/671 |

\* cited by examiner

*Primary Examiner* — Terrell McKinnon
*Assistant Examiner* — Bradley H Duckworth
(74) *Attorney, Agent, or Firm* — Ernest G. Cusick; Gary M. Hartman; Domenica N. S. Hartman

(57) ABSTRACT

An apparatus and method suitable for supporting a cylindrical component. The apparatus includes a pedestal having an upper surface with a semispherical concave shape, and a carriage supported on the upper surface of the pedestal. The carriage has a lower surface and an oppositely-disposed upper surface with elements for contacting and rotatably supporting the cylindrical component. The lower surface of the carriage engages the upper surface of the pedestal and has a semispherical convex shape complementary to the semispherical concave shape of the upper surface of the pedestal. The apparatus further includes a reservoir at and recessed in the upper surface of the pedestal, and a feature for delivering a lubricant to the lubricant reservoir. The lower surface of the carriage and the upper surface of the pedestal define an enclosure around the reservoir.

20 Claims, 8 Drawing Sheets

SELF-ALIGNING SUPPORT ASSEMBLY AND METHOD FOR ROTATABLE CYLINDRICAL COMPONENTS

BACKGROUND OF THE INVENTION

The present invention generally relates to equipment adapted for supporting articles. More particularly, this invention relates to a self-aligning support assembly capable of supporting a cylindrical component, and in particular large rotatable cylindrical components such as during the manufacture, inspection, and/or servicing of rotors and shafts of turbomachinery, generators, and other axisymmetric components.

Depending on particular operating conditions, rotors used in steam turbines, gas turbines, and jet engines can have assembled or monolithic constructions. For example, large steam turbines typically have a bolted construction made up of separate rotors, each having a shaft with an integrally-formed wheel whose rim is configured for mounting buckets (blades). The configuration and composition of each separate rotor segment are chosen for the particular section of the turbine (for example, high pressure and low pressure stages) in which the segment will be located. Rotors for gas turbines and jet engines are often constructed by bolting a series of disks and shafts together. Another rotor construction involves welding together rotor segments formed of dissimilar materials, forming what may be termed a multiple alloy rotor (MAR). Monolithic multiple alloy rotors have also been proposed.

Turbine rotors operate at high rotational speeds in a thermally-hostile environment. Though significant advancements have been made in alloys to achieve long service lives, wear, erosion, corrosion, shock, fatigue and/or overstress may occur, necessitating periodic inspection and, if necessary, repair or replacement of a rotor or shaft. Inspection and servicing of turbine components typically entail mounting the component in a lathe or similar apparatus adapted to rotate the component about its axis, for example, during cleaning, dimensional inspection, nondestructive examination (NDE), disassembly/assembly, and machining. The component is often supported from beneath with rollers that help support the weight of the component without interfering with its ability to rotate. Rollers used for this purpose are typically hardened to resist deformation and hold tolerances under the weight of the component. The non-pliant nature of hard rollers necessitates a long and careful setup to ensure proper alignment of the rollers to the component, including precisely orienting the axes of the rollers parallel to the component. For example, hard roller assemblies are often "blued-in" by applying layout dye to the surfaces of the component, and then adjusting the rollers to achieve a uniform pattern in the dye. As an alternative, soft rollers can be used that are sufficiently compliant to better tolerate misalignments. In some situations, soft rollers are used in an unaligned condition, in which case the surfaces of the rollers are sacrificial. While simplifying setup, soft rollers can be incapable of holding sufficiently tight tolerances for such operations as dimensional inspect and machining.

In view of the above, it would be desirable if the process of aligning hard rollers to a rotor component could be simplified without degrading the dimensional accuracy normally required of hard rollers when supporting a rotor during inspection and servicing.

BRIEF DESCRIPTION OF THE INVENTION

The present invention provides an apparatus and method suitable for supporting a cylindrical component in a manner that permits the component to rotate. An exemplary but non-limiting example is supporting a turbine rotor component during cleaning, dimensional inspection, nondestructive examination, disassembly, assembly, and/or machining of the component.

According to a first aspect of the invention, the apparatus includes a pedestal having an upper surface with a semispherical concave shape, and a carriage supported on the upper surface of the pedestal. The carriage has an upper surface and an oppositely-disposed lower surface, with the upper surface having one or more elements for contacting and rotatably supporting the cylindrical component. The lower surface of the carriage engages the upper surface of the pedestal and has a semispherical convex shape complementary to the semispherical concave shape of the upper surface of the pedestal. The apparatus further includes a lubricant reservoir at and recessed in the upper surface of the pedestal, and a feature for delivering a lubricant to the lubricant reservoir. The lower surface of the carriage and the upper surface of the pedestal define an enclosure around the lubricant reservoir.

According to a second aspect of the invention, the pedestal and the carriage of the apparatus are used to support the cylindrical component through the contact elements of the carriage, and sufficient lubricant pressure is provided within the lubricant reservoir to fluidically decouple the lower surface of the carriage from the upper surface of the pedestal to enable the carriage and its contact elements to self-align with the cylindrical component.

According to another aspect of the invention, a method of supporting a cylindrical component more broadly entails supporting the cylindrical component above a carriage supported on a pedestal, raising the pedestal and the carriage together to engage the cylindrical component with the carriage, and providing sufficient lubricant pressure between the carriage and the pedestal to fluidically decouple a lower surface of the carriage from an upper surface of the pedestal and thereby enable the carriage to self-align with the cylindrical component.

A significant advantage of this invention is that the decoupling and self-alignment effect provided by the combination of the lubricant and semispherical surface interface defined by and between the carriage and the pedestal allows for the use of a variety of components as the means for contacting the cylindrical component. For example, the apparatus can employ hard rollers as the contact elements, with the self-alignment capability serving to simplify the alignment of the rollers to the cylindrical component without degrading the dimensional accuracy normally achieved with hard rollers. The self-alignment capability of this invention further permits the use of other contact elements that might not otherwise be practical, for example, a rigid V-block, hydrodynamic bearings, or hydrostatic bearings that define a cradle for supporting a cylinder. In each case, the contact element is capable of holding sufficiently tight tolerances for such operations as dimensional inspections, machining, and other precision operations, during which rotation of the cylindrical component may be required.

Other aspects and advantages of this invention will be better appreciated from the following detailed description.

DETAILED DESCRIPTION OF THE INVENTION

Figure 1:
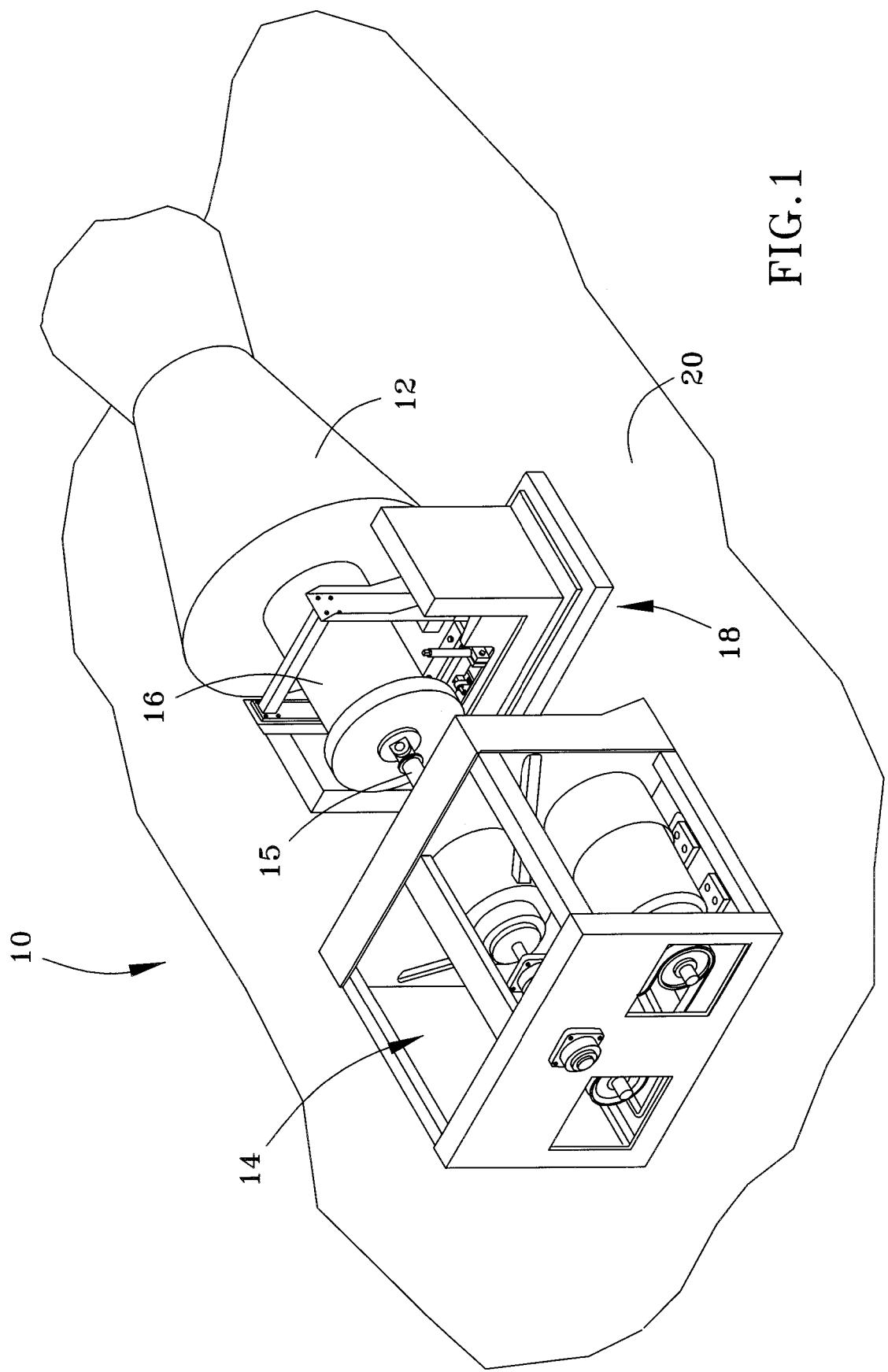
FIG. 1 is a perspective view of a turbine rotor repair station in accordance with an embodiment of this invention.

FIG. 1 represents a turbine rotor repair station 10 in accordance with an embodiment of this invention. A rotor component 12 is represented as being mounted in the station 10 for the purpose of undergoing inspection, service, or some other operation that may be desired during manufacturing or after the component 12 is returned from service. The component 12 is represented as having a relatively large diameter rotor shaft 16, though rotors and rotor shafts with far smaller diameters (FIGS. 2 and 8) are also within the scope of the invention. While the invention will be described in reference to rotor components, which may be rotors and shafts configured for installation in a steam turbine, gas turbine, jet engine, etc., cylindrical components other than rotors are also within the scope of this invention, including generator rotors, steel mill rolls, coal crushers, etc. Furthermore, though particularly adapted to support rotating components, from the following it will become apparent that the repair station 10 is also capable of supporting and preventing the rotation of eccentrically-loaded components, such as during the mounting of buckets (blades) on a rotor.

The station 10 is represented as having a motor 14 equipped with a drive shaft 15 adapted for coupling to the component 12 to enable the motor 14 to rotate the component 12 about its axis of rotation. The shaft 16 of the rotor component 12 is supported with a support assembly 18, and all of the equipment depicted in FIG. 1 is shown mounted to a platform 20. The station 10 can be a permanent facility within a service center, or can be configured with its platform 20 to have a portable capability.

Figure 2:
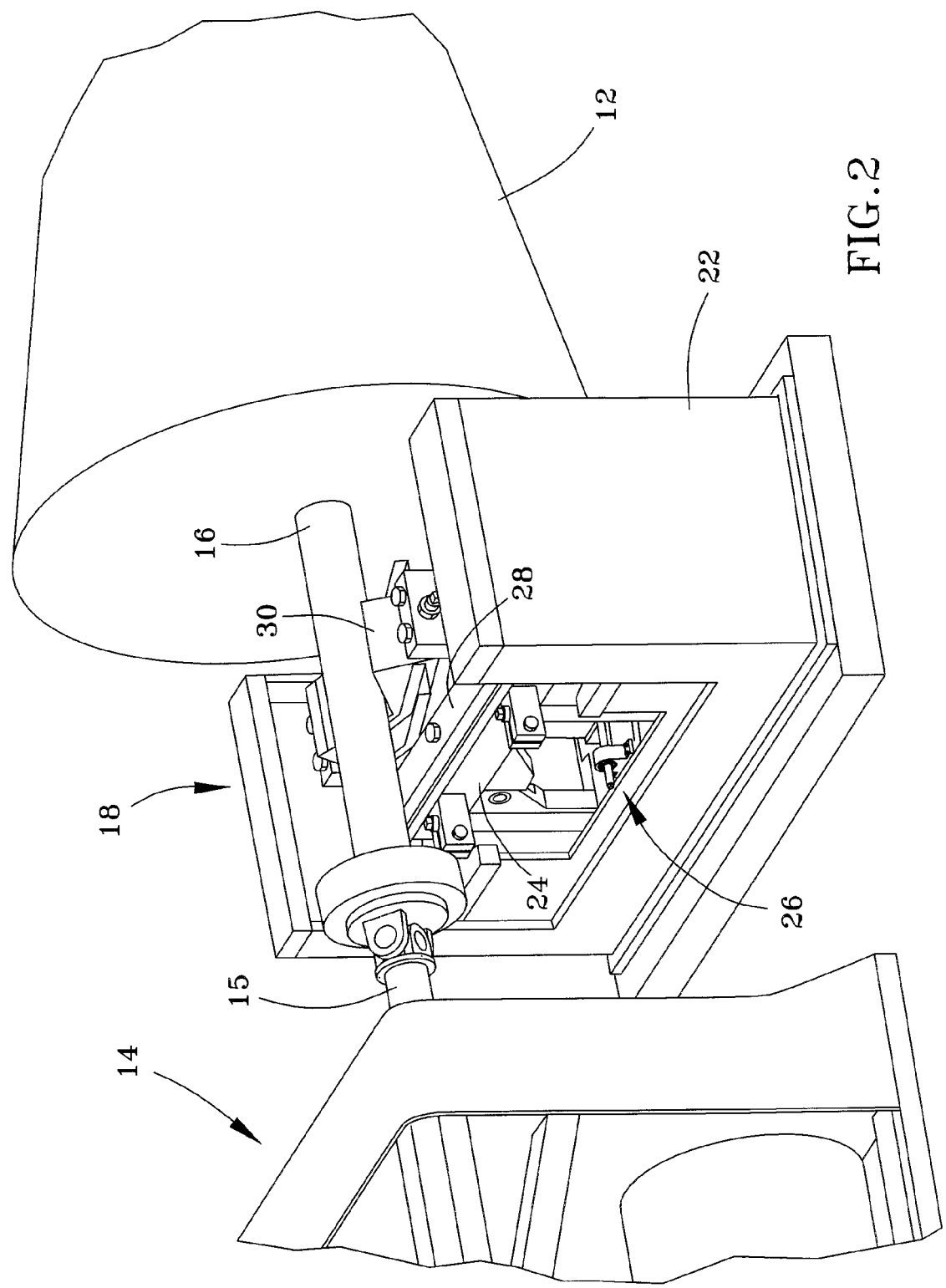
FIG. 2 is a more detailed perspective view of a support assembly of the repair station of FIG. 1.

FIG. 2 shows the support assembly 18 of FIG. 1 in greater detail, with the large-diameter component 12 replaced by a small-diameter component 12 (e.g., a shaft) to reveal more detail of the assembly 18. The assembly 18 is represented as generally comprising a frame 22, a table 24 mounted within the frame 22, an actuation system 26 for raising and lowering the table 24 within the frame 22, a pedestal unit 28 mounted on top of the table 24, and a carriage unit 30 supported on the pedestal unit 28. The frame 22 can be rigidly attached to the platform 20, or can be supported by bearings (not shown) to mechanically decouple the support assembly 18 and its components from the motor 14 and the surroundings.

Figure 3:
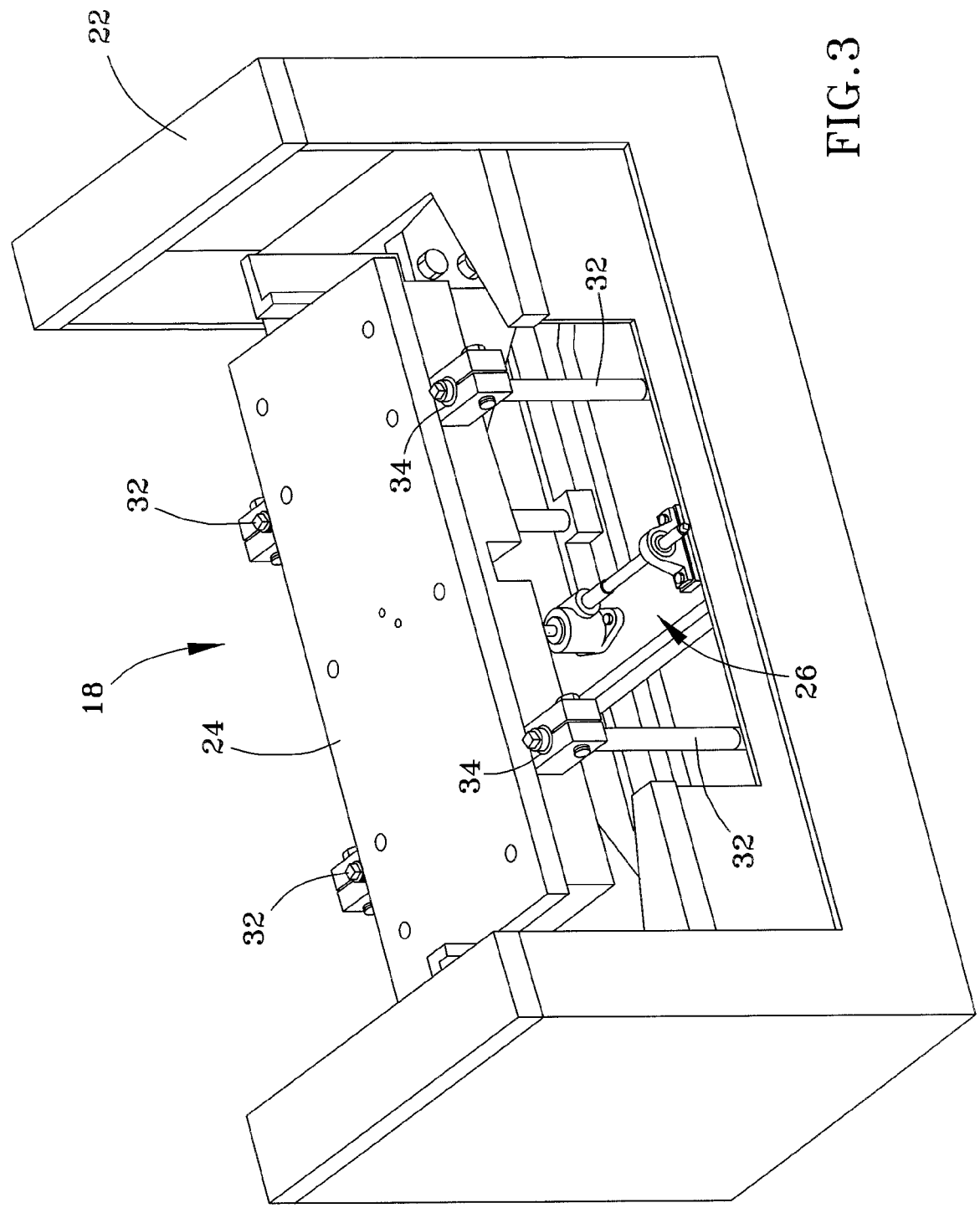
FIGS. 3 and 4 are perspective views of a table of the support assembly of FIG. 2 in raised and lowered positions, respectively.
Figure 4:
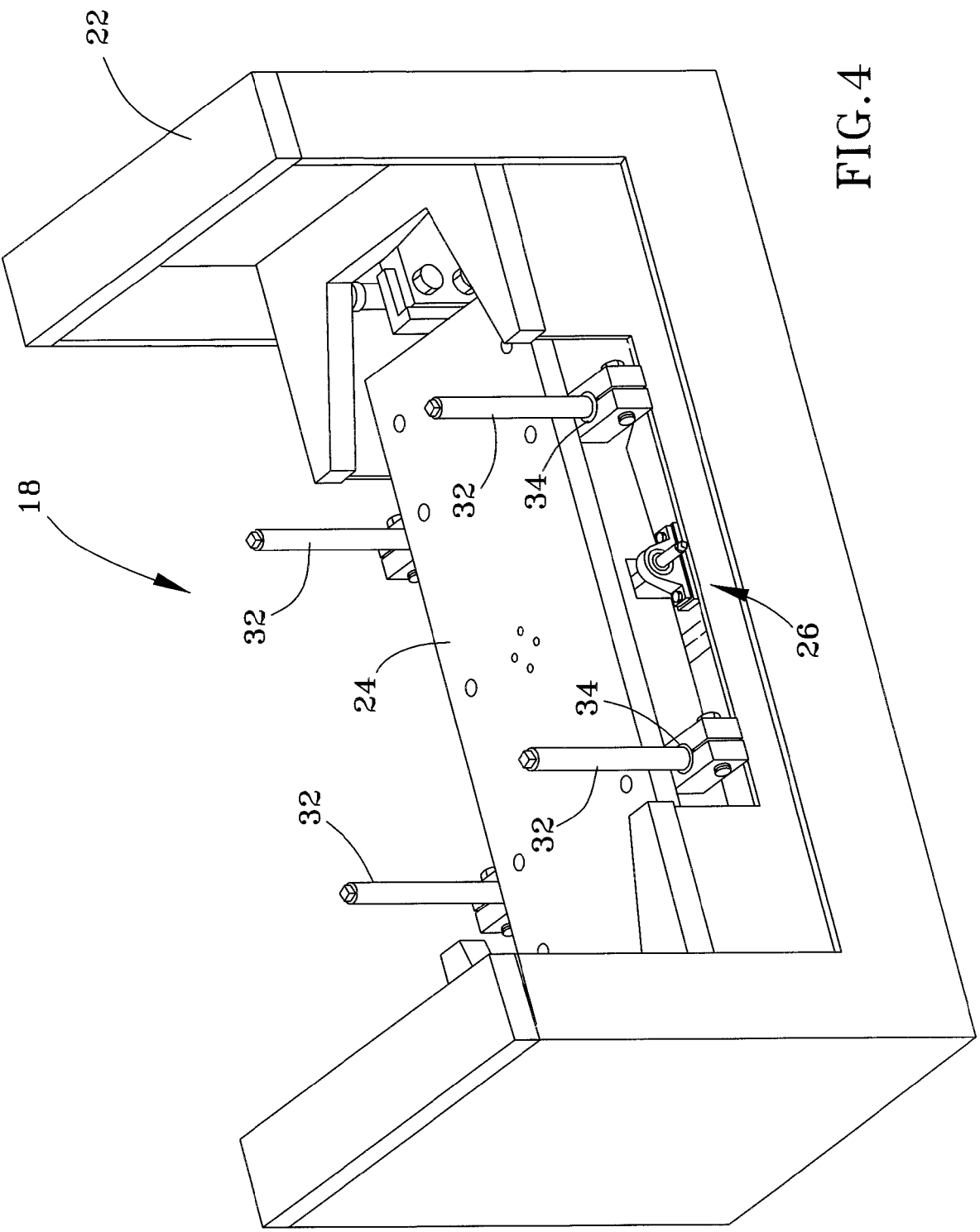

The frame 22, table 24, and actuation system 26 are represented in more detail in FIGS. 3 and 4, which are isolated views of the support assembly 18 without the component 12, pedestal unit 28, and carriage unit 30. FIG. 3 shows the table 24 in a raised position resulting from the operation of the actuation system 26, which is represented as an electrically-actuated power screw assembly though it could be another mechanical system, a hydraulic system, or an electrical system. The horizontal orientation of table 24 is maintained in part by coupling the table 24 to posts 32 mounted to the frame 22. In FIGS. 1 through 4, four posts 32 are shown coupled to the table 24 with journal bearings 34, though any number of posts 32 could be used, for example one at each end of the table 24. While the actuation system 26 and posts 32 are represented as two separate units, it is also foreseeable that the actuation system 26 could be integrated into the posts 32. Furthermore, the frame 22 and table 24 can have a variety of configurations capable of promoting their mechanical integrity while, if so desired, minimizing their weight. As such, the frame 22, table 24, actuation system 26, posts 32, etc., shown in FIGS. 1 through 4 are merely for illustrative purposes and, aside from their functions of supporting and raising the pedestal and carriage units 28 and 30 into engagement with the component 12, do not limit the scope of the invention.

Figure 5:
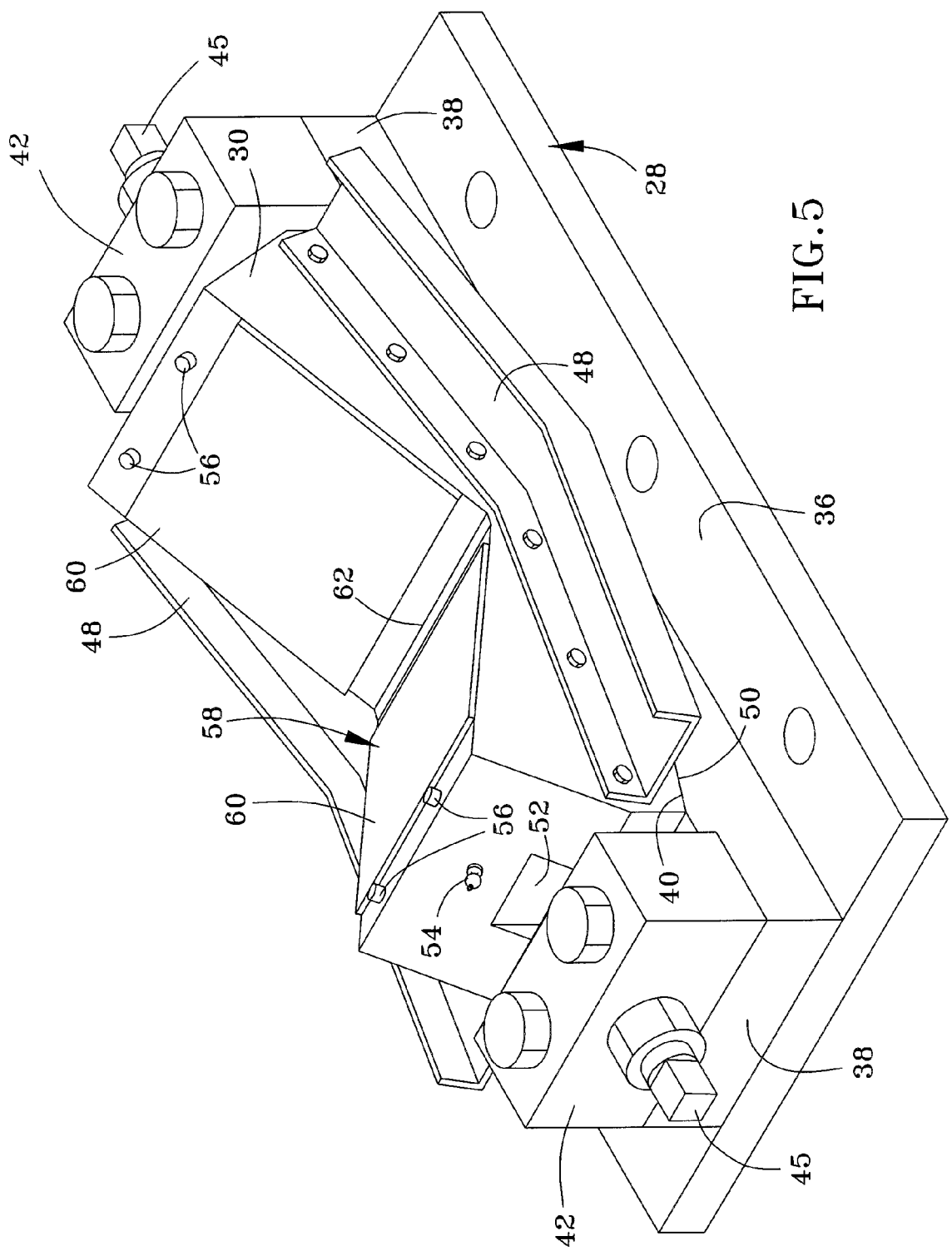
FIG. 5 is a perspective view of a carriage and pedestal assembly of the support assembly of FIGS. 2 through 4, showing the carriage equipped with a V-block for supporting a rotor component in accordance with an embodiment of this invention.
Figure 6:
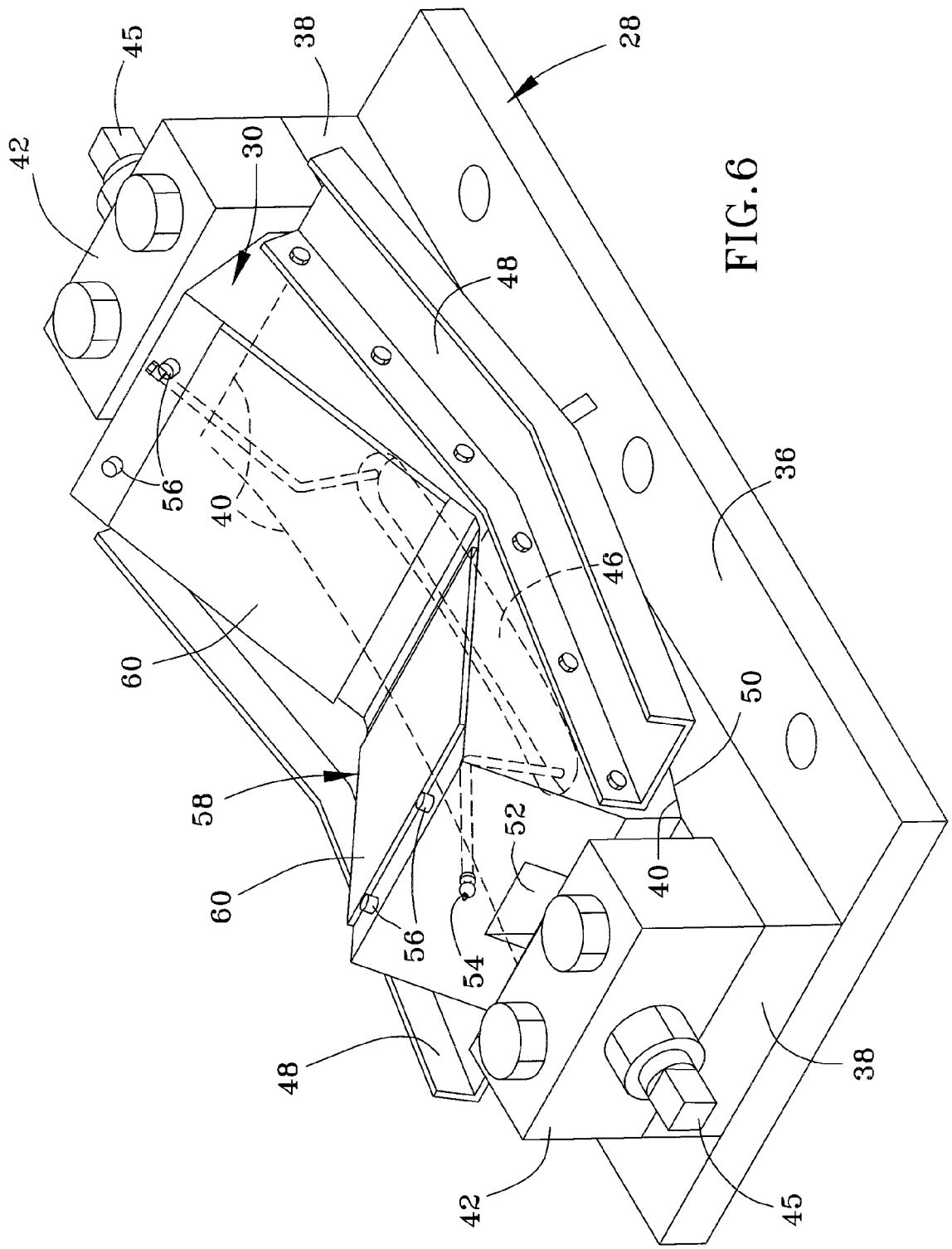
FIG. 6 is a perspective view of the carriage and pedestal assembly of FIG. 5, showing internal components of the assembly.

FIGS. 5 and 6 show more detailed views of the pedestal and carriage units 28 and 30 shown in FIGS. 1 and 2. The pedestal unit 28 comprises a base plate 36 adapted to be secured to the table 24 with bolts. The base plate 36 has a raised central rail 38 integrally machined with the base plate 36, though it is foreseeable that the central rail 38 could be separately fabricated and attached to the plate 36. The central rail 38 defines an upper surface 40 of the pedestal unit 28 on which the carriage unit 30 is supported through contact with a lower surface 50 (FIG. 6) of the carriage unit 30. A pair of mounting blocks 42 are shown bolted to opposite ends of the central rail 38, from which trunnions 44 (FIG. 8) extend toward each other to provide a support for the carriage unit 30. The trunnions 44 are shown as defined by ends of bolts 45 threaded into the blocks 52, which allow the trunnions 44 to be threaded into clamping engagement with slots or recesses 52 (FIGS. 6 and 8) defined at opposite ends of the carriage unit 30, enabling the trunnions 44 to secure the carriage unit 30 to the pedestal unit 28 and preferably immobilize the carriage unit 30 on the pedestal unit 28 when supporting the weight of the component 12. Alternatively, the trunnions 44 can be hydraulically operated to engage and disengage the recesses 52. Still another alternative is to couple the carriage unit 30 to the pedestal unit 28 by other types of clamps mounted to the pedestal unit 28 and operable to engage the ends and/or sides of the carriage unit 30.

FIG. 6 shows the upper surface 40 of the pedestal unit 28 as defining a semispherical concave shape within which a reservoir 46 is centrally formed. As will be discussed in greater detail below, the reservoir 46 is intended to contain a fluid, and more particularly a lubricant such as a hydraulic fluid, oil or grease capable of decoupling the carriage unit 30 from the surface 40 of the pedestal unit 28. The fluid capacity of the reservoir 46 necessary for this purpose will depend on the surface area of the reservoir 46 and the lubricant pressure available to the reservoir 46. The lubricant can be delivered to the reservoir 46 through fittings 54, which are shown located at either end of the carriage unit 30 though various other locations are also possible, including up through the table 24 and pedestal unit 28. Surrounding the reservoir 46, the semispherical concave upper surface 40 of the pedestal unit 28 is preferably continuous and smooth to provide uniform contact with the semispherical convex lower surface 50 of the carriage unit 30.

The lower surface 50 of the carriage unit 30 preferably has a semispherical convex shape complementary to the semispherical concave shape of the upper surface 40 of the pedestal unit 28, such that the upper and lower surfaces 40 and 50 achieve a close surface-to-surface contact. In addition, the perimeters of these surfaces 40 and 50 provide a surface-to-surface seal that encloses the lubricant reservoir 46. This surface-to-surface seal is preferably fluid-tight or nearly so under the weight of the component 12 when the carriage unit 30 is pressed downwardly onto the pedestal unit 28, such that the lubricant within the reservoir 46 can be pressurized to force lubricant from the reservoir 46 and provide a lubrication film between the upper and lower surfaces 40 and 50 of the pedestal and carriage units 28 and 30. Lubricant expelled from between the surfaces 40 and 50 of the pedestal and carriage units 28 and 30 can be collected and returned to the reservoir 46 with troughs/flanges 48 provided along the sides of the carriage unit 30.

The trunnions 44 and their respective recesses 52 prevent the carriage unit 30 from being unintentionally displaced from the surface 40 of the pedestal unit 28. Furthermore, the trunnions 44 define an axis about which the carriage unit 30 can pivot when not subject to the clamping load of the trunnions 44. As the carriage unit 30 becomes subject to the weight of the component 12, the complementary semispherical shapes of the upper and lower surfaces 40 and 50 of the pedestal and carriage units 28 and 30 and the lubrication film therebetween enable the carriage unit 30 to slide and move relative to the pedestal unit 28, enabling the carriage unit 30 to align to the loading imposed by the component 12. The trunnions 44 restrict the movement of the carriage unit 30 to the extent that it narrowly limits the pitching motion (in a plane through the axis of the trunnions 44 and normal to the surface 40) of the carriage unit 30, while allowing a limited degree of yaw (twisting) motion (about an axis normal to the pedestal surface 40) and rolling motion (about the axis of the trunnions 44).

Figure 8:
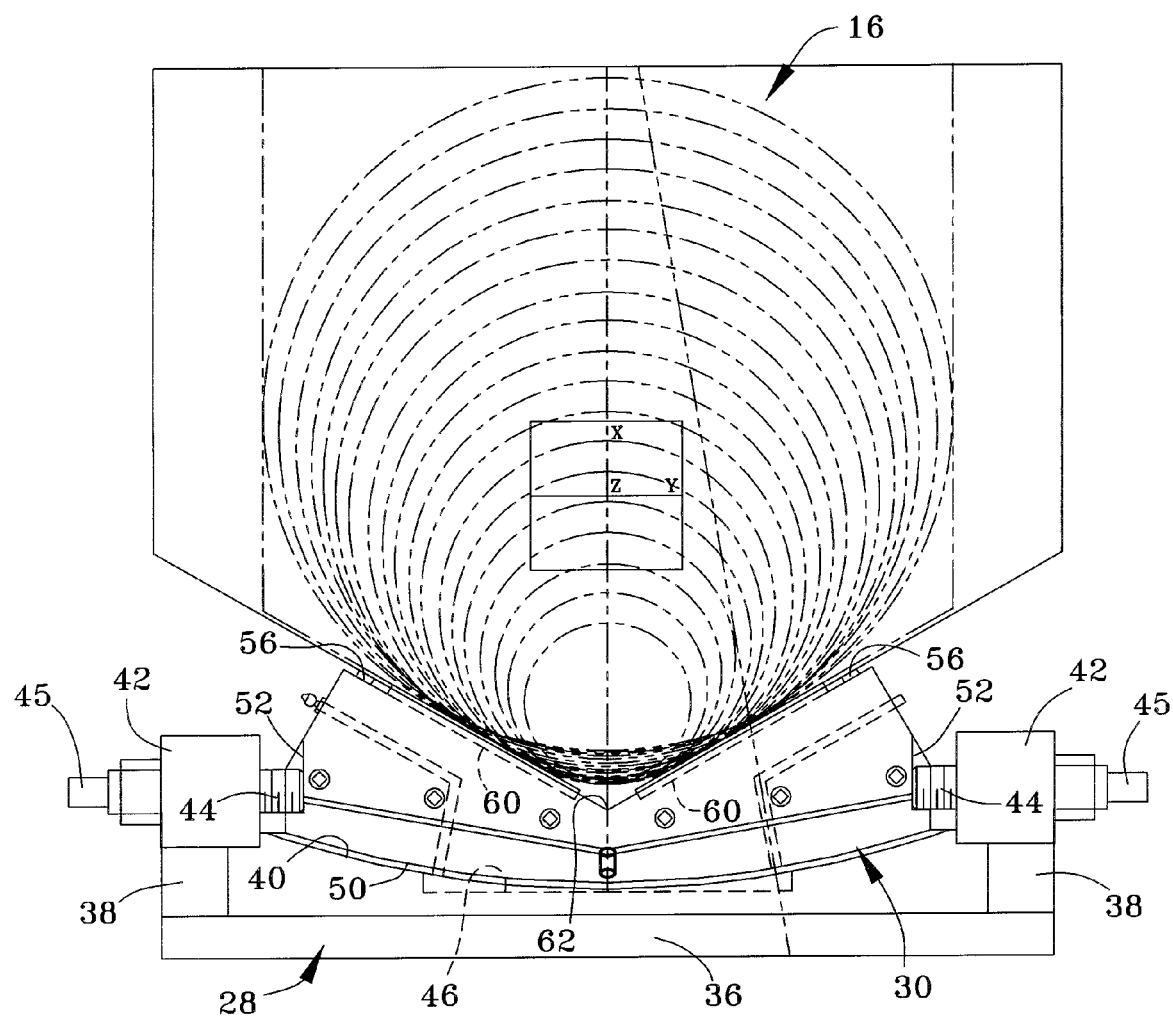
FIG. 8 is an end view of the carriage and pedestal assembly of FIGS. 5 and 6, schematically showing cylinders of various diameters supported on the V-block.

The carriage unit 30 is provided with one or more contact elements capable of supporting the rotor component 12, preferably to allow the component 12 to rotate while supported by the support assembly 18. As represented in FIGS. 1, 2, 5 and 6, the contact elements comprise a V-block 58. The V-block 58 generally has opposing pads 60 inclined relative to each other and separated by a linear joint 62 at the base of the V-shape. The pads 60 are aligned in a direction parallel to the axis defined by the trunnions 44, such that the V-block 58 and its pads 60 remain substantially centered on the pedestal unit 28. As evident from FIGS. 1 and 2 and particularly FIG. 8, the carriage unit 30 is oriented on the support assembly 18 so that the axis of the component 12 is parallel to and directly above the joint 62 between the pads 60, and the pads 60 approximately symmetrically oppose each other when contacting the component 12. FIG. 8 further evidences the ability to accommodate rotor components 12 of a wide range of diameters on the carriage unit 30. To minimize wear and promote a low-friction contact with the component 12, the pads 60 are preferably formed of a material softer than the material of the component 12 being supported, with particularly suitable materials believed to be Babbitt metals, nylon, and textolite. The V-block 58 is further represented in FIGS. 5 and 6 as equipped with ports 56 from which a suitable lubricant (e.g., hydraulic fluid) can be directed onto the surfaces of the pads 60 to generate a lubricant film that serves as hydrodynamic bearings capable of supporting the component 12 above the pads 60. It is foreseeable that the hydrodynamic bearings could be used without the pads 60.

Figure 7:
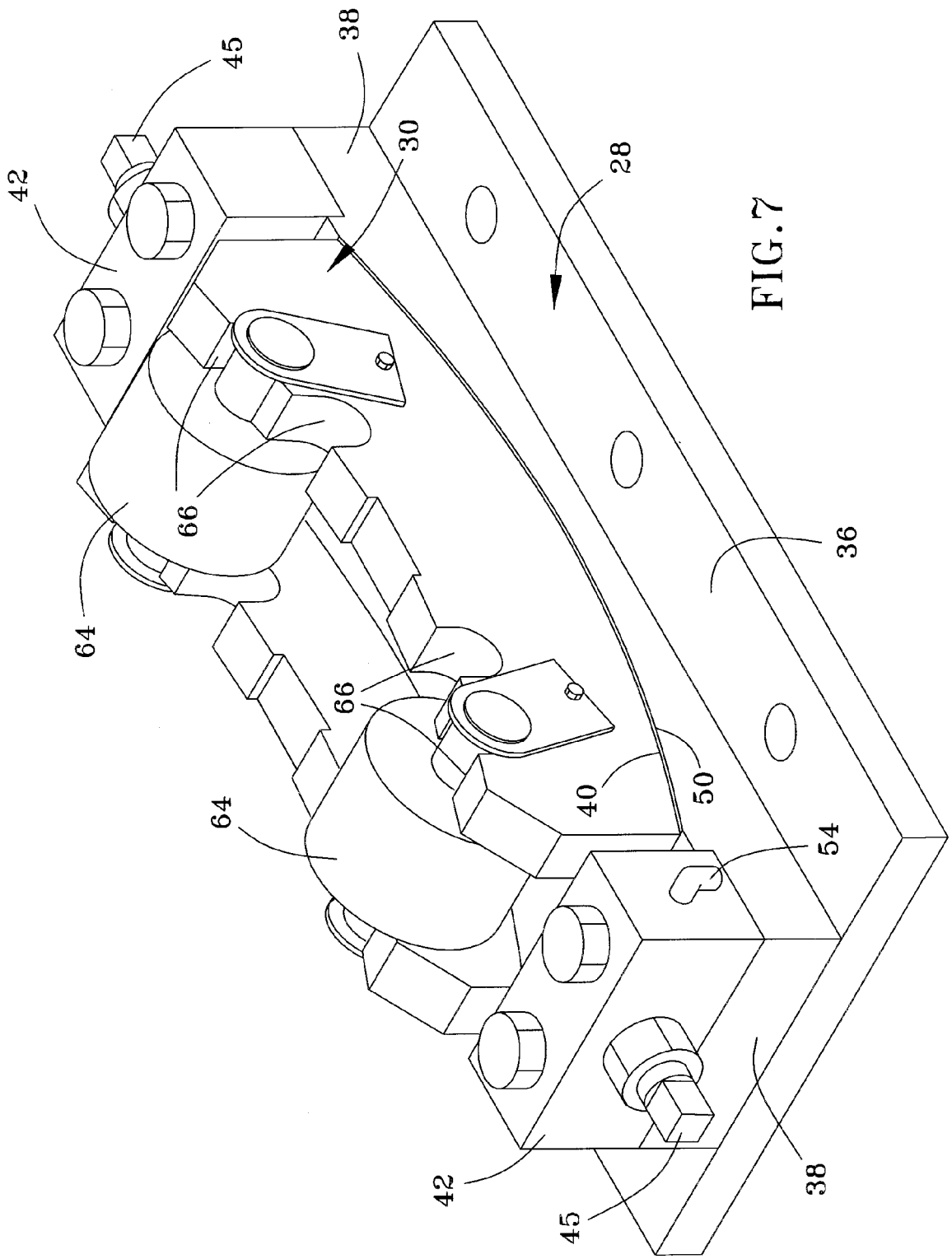
FIG. 7 is a perspective view of a carriage and pedestal assembly similar to FIGS. 5 and 6, but equipped with rollers instead of the V-block in accordance with another embodiment of this invention.

Finally, FIG. 7 is a perspective view of the pedestal and carriage units 28 and 30 similar to what is shown in FIG. 5, but equipped with rollers 64 instead of the V-block 58 as contact elements in accordance with another embodiment of this invention. As with the pads 60 of the V-block 58 in FIG. 5, the rollers 64 are aligned in a direction parallel to the axis defined by the trunnions 44, such that the rollers 64 remain substantially centered on the pedestal unit 28. Furthermore, the axes of rotation of the rollers 64 are oriented transverse to the axis of the trunnions 44 but parallel to the axis of the component 12 supported on the carriage unit 30, such that the rollers 64 are approximately symmetrically opposed from each other when contacting the component 12. Because of the self-alignment capability providing by the complementary semispherical shapes of the upper and lower surfaces 40 and 50 of the pedestal and carriage units 28 and 30, enabling the axes of the rollers 64 to automatically align with the axis of the component 12 under the load imposed by the component 12, the drawbacks of using hard rollers are avoided, permitting the rollers 64 to be manufactured from very wear-resistant materials with hardnesses of 25 Rockwell C or greater, such as an alloy steel. Particularly preferred materials are believed to be AISI 4140 with hardnesses of 30 Rockwell C or greater. Suitable diameters for the rollers 64 are generally about eight inches (about 20 cm), with greater and lesser diameters being foreseeable. Finally, FIG. 7 shows the carriage unit 30 as equipped with multiple yokes 66 in which the rollers 64 can be supported to accommodate rotor components 12 of various diameters.

Based on the foregoing, it should be understood that a wide variety of bearings and other contact elements could be used in place of the V-block 58 (with hydrodynamic bearings (ports 56) and/or pads 60) and the rollers 64. Furthermore, various materials can be used to construct the pedestal and carriage units 28 and 30, with nonlimiting examples being carbon steels and structural steels such as ASTM A36.

In use, the support assembly 18 and its pedestal and carriage units 28 and 30 are adjusted to the centerline of the motor 14, the carriage unit 30 and its contact elements (V-block 58, rollers 64, etc.) are hydraulically lifted with the fluid within the lubricant reservoir 46, and the component 12 is coupled to the motor 14 through the drive shaft 15 before placing the weight of the component 12 on the carriage unit 30 and its contact elements. Hydraulic pressure is then released from the reservoir 46, allowing the carriage unit 30 to settle into alignment on the pedestal unit 28. The trunnions 44 are then moved into engagement with the recesses 52 to secure and preferably immobilize the carriage unit 30 on the pedestal unit 28.

While the invention has been described in terms of specific embodiments, it is apparent that other forms could be adopted by one skilled in the art. For example, the physical configuration of the pedestal and carriage units 28 and 30, as well as the turbine rotor repair station 10 with which the units 28 and 30 are to be used, could differ from those shown in the figures, and materials and processes other than those noted could be used. Therefore, the scope of the invention is to be limited only by the following claims.

The invention claimed is:

1. An apparatus for supporting a cylindrical component, the apparatus comprising:
   a pedestal comprising an upper surface having a semispherical concave shape;
   a lubricant reservoir at and recessed in the upper surface of the pedestal;
   means for delivering a lubricant to the lubricant reservoir; and
   a carriage supported on the upper surface of the pedestal, the carriage having an upper surface and an oppositely-disposed lower surface, the upper surface comprising contacting means for contacting and rotatably supporting the cylindrical component, the lower surface engaging the upper surface of the pedestal and having a semispherical convex shape complementary to the semispherical concave shape of the upper surface of the pedestal, the lower surface of the carriage and the upper surface of the pedestal defining an enclosure around the lubricant reservoir.

2. The apparatus according to claim 1, wherein the contacting means comprises rollers rotatably mounted at the upper surface of the carriage.

3. The apparatus according to claim 2, wherein each of the rollers has a hardness of at least 25 Rockwell C.

4. The apparatus according to claim 1, wherein the contacting means comprises a hydrodynamic bearing means.

5. The apparatus according to claim 1, wherein the contacting means comprises a V-shaped block.

6. The apparatus according to claim 5, wherein the V-shaped block comprises two members inclined relative to each other.

7. The apparatus according to claim 6, wherein each of the members is formed of a material softer than the component.

8. The apparatus according to claim 1, further comprising means for coupling the carriage to the pedestal.

9. The apparatus according to claim 8, wherein coupling means is operable to clamp and immobilize the carriage on the pedestal.

10. The apparatus according to claim 1, wherein the means for lubricant delivering comprises an inlet fluidically connected to the lubricant reservoir.

11. The apparatus according to claim 1, wherein the means for lubricant delivering comprises means for collecting any of the lubricant expelled from between the lower surface of the carriage and the upper surface of the pedestal and returning the expelled lubricant to the lubricant reservoir.

12. The apparatus according to claim 1, wherein the means for lubricant delivering comprises means for increasing pressure within the lubricant reservoir to fluidically decouple the lower surface of the carriage from the upper surface of the pedestal and thereby enable the carriage and the contacting means thereof to self-align as the contacting means are brought into contact with the cylindrical component.

13. The apparatus according to claim 12, wherein the means for lubricant delivering comprises means for collecting any of the lubricant expelled from between the lower surface of the carriage and the upper surface of the pedestal and returning the expelled lubricant to the lubricant reservoir.

14. The apparatus according to claim 1, further comprising a table supporting the pedestal and the carriage, and means for raising and lowering the table.

15. The apparatus according to claim 1, wherein the apparatus is adjacent a motor configured for coupling to and rotating the cylindrical component while supported on the apparatus.

16. A method of using the apparatus according to claim 1 to support the cylindrical component, the method comprising:
    supporting the cylindrical component with the pedestal and the carriage and engaging the cylindrical component with the contacting means of the carriage; and
    providing sufficient lubricant pressure within the lubricant reservoir to fluidically decouple the lower surface of the carriage from the upper surface of the pedestal and thereby enable the carriage and the contacting means thereof to self-align with the cylindrical component.

17. The method according to claim 16, wherein the cylindrical component is a turbine rotor or shaft.

18. A method of supporting a cylindrical component, the method comprising:
    supporting the cylindrical component above a carriage supported on a pedestal;
    providing sufficient lubricant pressure between the carriage and the pedestal to fluidically decouple a lower surface of the carriage from an upper surface of the pedestal so as to allow a degree of yaw motion and rolling motion of the carriage relative to the pedestal; and
    raising the pedestal and the carriage together to engage the cylindrical component with the carriage, the fluidic decoupling of the lower surface of the carriage from the upper surface of the pedestal enabling the carriage to self-align with the cylindrical component.

19. The method according to claim 18, wherein the cylindrical component is contacted by at least two opposing members of the carriage that define an axis therebetween, and the cylindrical component is coupled to and rotated by a motor configured for coupling to and rotating the cylindrical component while the cylindrical component is supported on the apparatus with an axis of rotation of the cylindrical component parallel to the axis between the opposing members of the contacting means.

20. The method according to claim 18, wherein the cylindrical component is a turbine rotor or shaft.

* * * * *